May 30, 1961 E. M. JONES 2,986,726

ANALOG TO DIGITAL ENCODER

Filed April 8, 1957 6 Sheets-Sheet 1

Inventor
Edward M. Jones
By Graf, Nierman & Burmeister
Attorneys

May 30, 1961 E. M. JONES 2,986,726

ANALOG TO DIGITAL ENCODER

Filed April 8, 1957 6 Sheets-Sheet 2

Inventor
Edward M. Jones
By Graf, Nierman & Burmeister
Attorneys.

May 30, 1961

E. M. JONES 2,986,726

ANALOG TO DIGITAL ENCODER

Filed April 8, 1957

6 Sheets-Sheet 3

Inventor
Edward M. Jones
By Graf, Nierman & Burmeister
Attorneys

Inventor
Edward M. Jones
By Graf, Nierman & Burmeister
Attorneys

Inventor
Edward M. Jones
By Gróf, Nierman & Burmeister
Attorneys

Inventor
Edward M. Jones
By
Graf, Nierman & Burmeister
Attorneys 2,986,726

ANALOG TO DIGITAL ENCODER

Edward M. Jones, Cincinnati, Ohio, assignor to The Baldwin Piano Company, Cincinnati, Ohio, a corporation of Ohio Filed Apr. 8, 1957, Ser. No. 651,389

21 Claims. (Cl. 340—347)

The present invention relates to digital code disc converters, and more particularly to a system for obtaining a vernier reading from a code member, specifically, but not necessarily a disc.

Heretofore, it has been assumed that the quanta obtainable from a code disc was limited by the number of digits on the disc. Thus, the quanta from a sixteen digit cyclic binary code disc would be 65,536. The arc of each quanta would be zero degrees, zero minutes, 19.77 seconds. To maintain the error due to spreading of the photographic image and bearing imperfections to a small fraction of a quanta, a plate is required with a diameter of nearly sixteen inches. Thus, it becomes apparent that at present an increase to a twenty digit code disc encounters various problems. The size and accuracy required by present manufacturing methods is considered impractical.

In accordance with the present invention, it is proposed to obtain quanta equivalent to those derived from a twenty digit code disc from a sixteen digit code disc by a vernier method or system. This system is applicable to any code member, be it circular, rectilinear, cylindrical, conical, or otherwise, even though made by manufacturing methods far improved over those now available, or applicable to smaller code discs in order to achieve compactness, so that at least four extra digits are obtainable in excess of those normally obtained from the disc by present conventional methods. In accordance with the present invention, sinusoidal signals are utilized to derive thirty-two quanta per sine wave. These signals are derived from auxiliary equipment associated with a reference circle having a large number of divisions. These quanta are then correlated or integrated with other quanta obtained in the normal manner from a code member, such as a disc or a wheel.

It, therefore, is an object of the present invention to provide a high accuracy analog-to-digital encoder.

Another object of the invention is to provide an analog-to-digital encoder to measure angular increments represented by twenty "straight" binary digits.

Another object of the invention is to provide a system which derives a vernier cyclic code which meshes with a coarser code derived from a code member.

Another object of the invention is to derive at least four extra digits beyond those digits normally available from a code disc with present methods.

Still another object of the invention is to provide an arrangement for integrating a large number of divisions in a code member reference track to eliminate the effects of dust and imperfections.

A still further object of the invention is to provide an arrangement in an analog-to-digital encoder for deriving a sinusoidal output voltage in accordance with a code disc reference circle.

Other and further objects subsequently will become apparent by reference to the following description taken in conjunction with the accompanying drawings, wherein.

Figure 1:
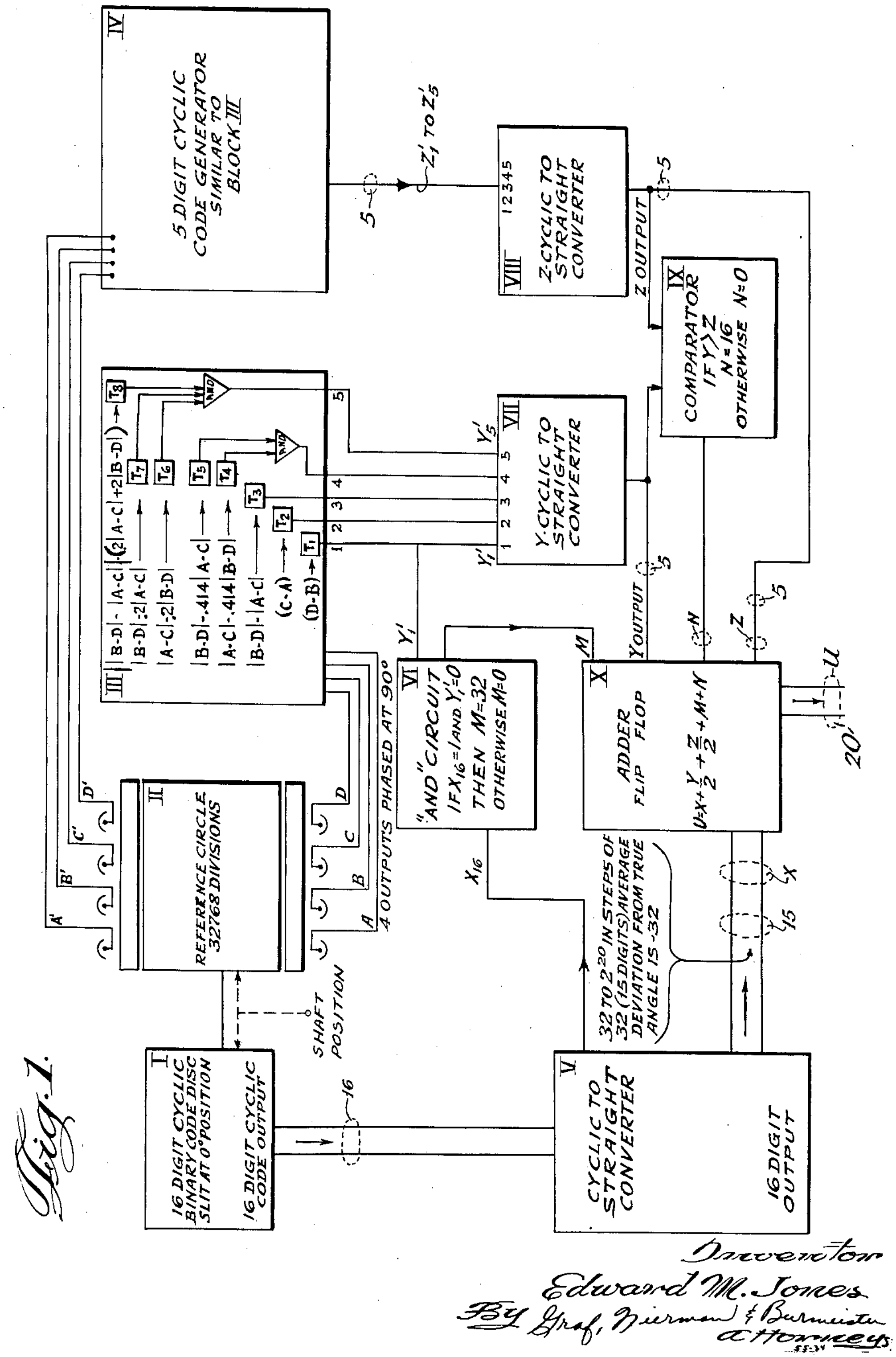
Figure 1 is a block diagram of a system for obtaining extra digits and coordinating them with digits derived from a code disc to provide an output corresponding to the digits which would have been derived from a much larger code disc.
Figures 9, 10:
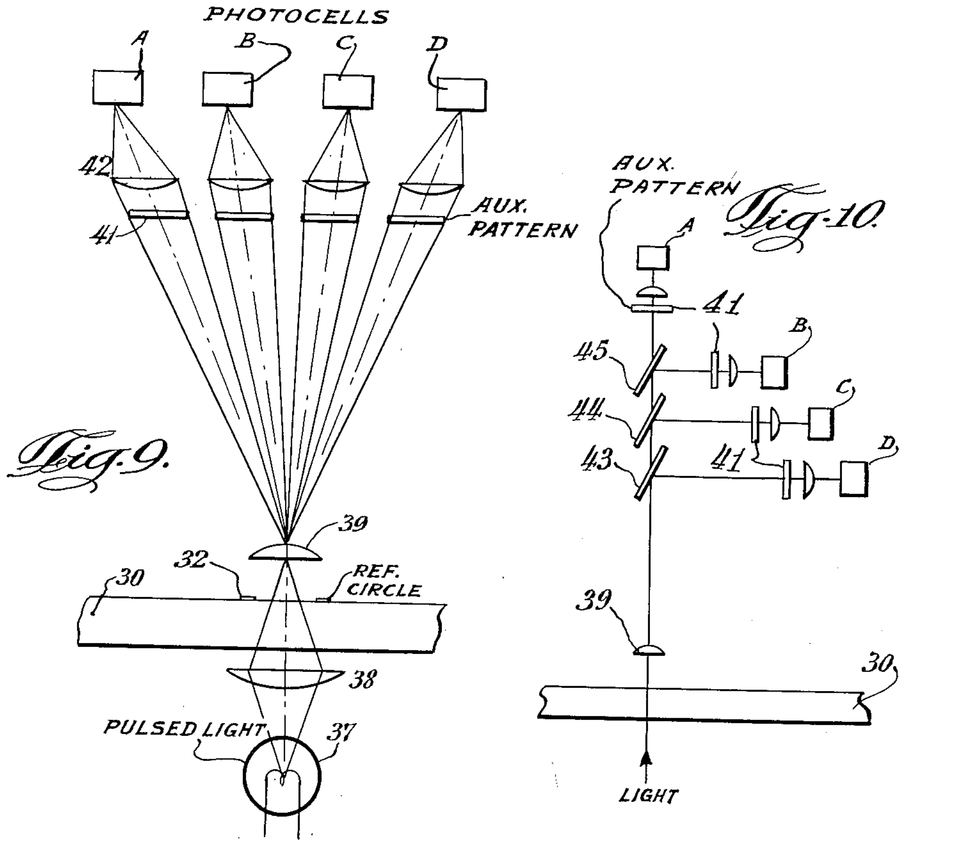
Figure 8:
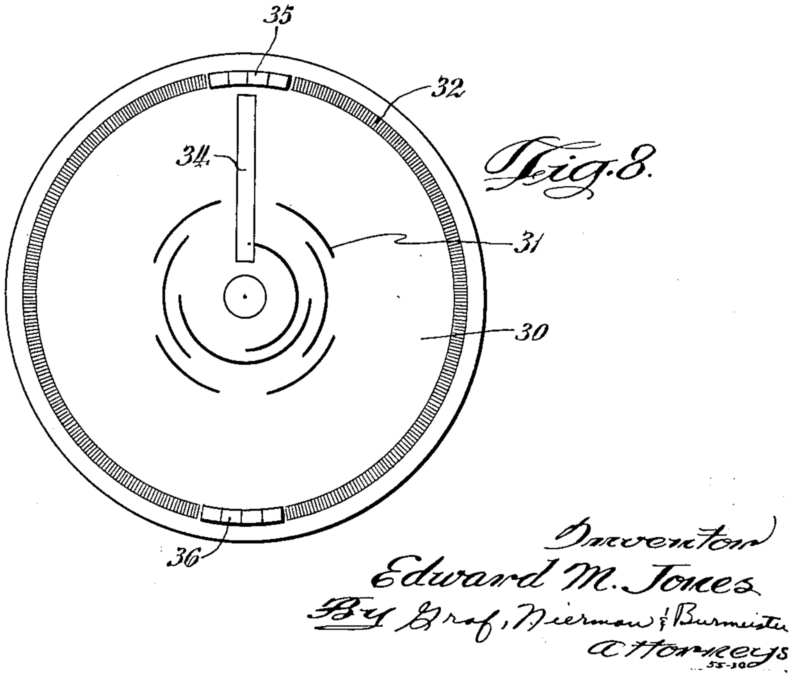
Figure 11:
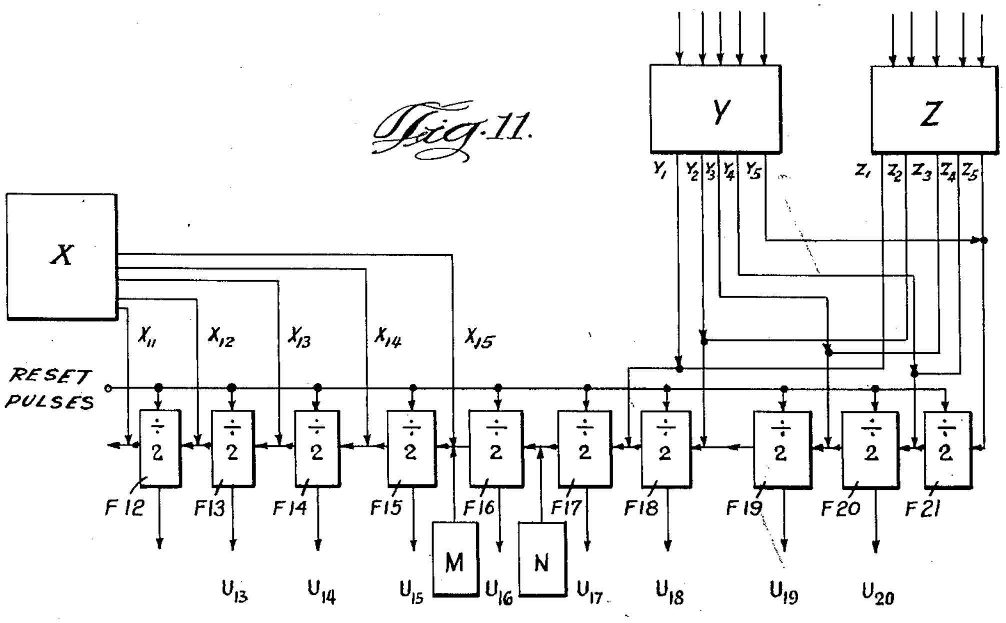
Figure 12:
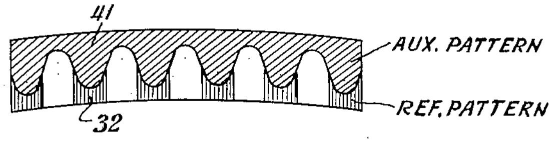
Figure 13:
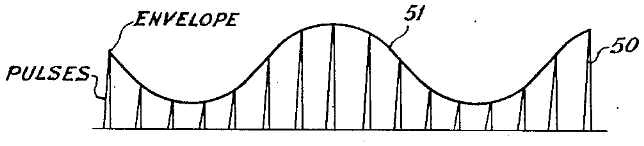
Figure 14:
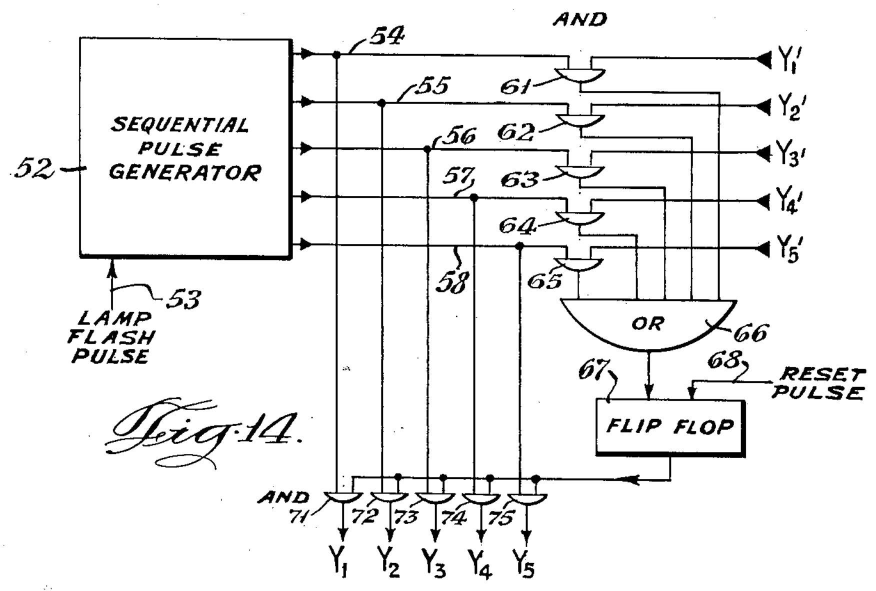
Figure 15:
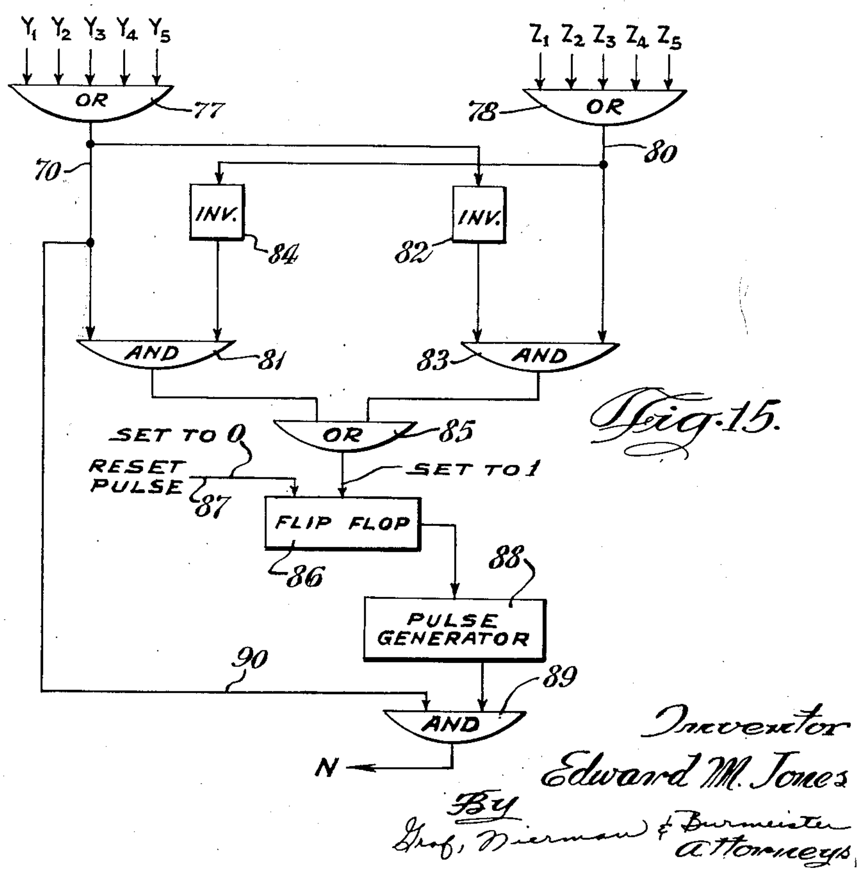

Figure 8 diagrammatically illustrates an arrangement for eliminating certain ambiguities and errors in the system of Figure 1;

Figures 9 and 10 diagrammatically illustrate details of the arrangement represented in Figure 8;

Figure 11 is a partial block diagram illustrating the operation of certain elements of Figure 1;

Figures 12 and 13 are diagrammatic representations illustrating the manner of obtaining sinusoidal wave outputs derived in accordance with a code disc reference circle;

Figure 14 is a diagrammatic representation showing one way of performing the cyclic to straight conversion indicated by rectangles VII and VIII of Figure 1; and Figure 15 is a diagrammatic representation of a comparator arrangement suitable for performing the action indicated by rectangle IX of Figure 1.

Generally speaking, an encoder constructed according to the present invention is capable of encoding analogue information into a greater number of digits without losing accuracy because of the fact that a number of the less significant digits are generated with the required accuracy by a code generator, and these digits are added to the digits directly encoded by the optical code member. The code which forms the less significant digits is generated from a reference track carried by the code member itself, thus assuring proper phase relations between the directly encoded digits and the less significant digits which are obtained from a code generator. Four sinusoidally varying voltages with equal phase differences are derived from the reference track of the code member and employed to generate a five digit cyclic code. As a result of deriving sinusoidally varying voltages from the reference track, rather than employing transitions to determine angular displacement as is done with the more significant digits, only the centers of the reference track require the accuracy implied by the total number of digits of the code, and an averaging technique is here employed to reduce these errors. In order to eliminate errors due to mechanical defects in the rotation of the code disc, two five digit cyclic codes are generated from sinusoidally varying voltages derived from the reference track on opposite sides of the code disc, and these codes are combined to cancel out such errors. Both the more significant digits and the less significant digits are converted from cyclic to straight code, and appear combined as a single parallel output.

The block diagram in Figure 1 illustrates a system for obtaining additional quanta or digits from a digital code disc to increase the accuracy of final reading, or to decrease the incremental values beyond those normally obtainable by commonly used conventional methods employing a code disc converter system. To illustrate the invention certain assumptions will be made, which are not deemed to be limitations, but merely illustrate the advantages which are obtainable by the present invention. At present due to various limitations, it is considered uncommon to employ a cyclic binary code having more than sixteen digits. Hence in the present instance, it is assumed that a sixteen digit binary code disc having a least significant track containing 16,384 divisions and then a reference circle of 32,768 divisions is employed. This disc is so utilized as to obtain from rectangle I of Figure 1 a sixteen digit cyclic code output.

At the same time rectangle II illustrates that additional data are obtainable from the reference circle by the use of two groups of auxiliary gratings and photocells. With the refined arrangement of reading this additional circle described below, this circle can have defects not normally tolerated in code discs, such as variation in width and density of the divisions in various parts of the circle. Actually the only requirement of this extra circle is that the centers of the divisions are accurate within the one second or better accuracy implied by the 20 digit system, and that the bearing maintains the center of rotation at the center of this circle within a distance corresponding to 1/4 of the center to center spacing of these divisions.

It will be noted that four photocells A, B, C, and D are obtained at the zero degree position of the reference circle and that at 180° there are located four photocells A′, B′, C′, and D′. Each group of photocells supplies outputs which are separated by a phase relation of 90°. The light entering each of these two groups of photocells is integrated over approximately 100 divisions of the 32,768 division reference circle to eliminate the effects of dust and other imperfections. The auxiliary gratings interposed between the reference circle and the groups of photocells are so designed as to provide a sinusoidally varying output voltage at each photocell. It is desired to obtain substantially perfect sine wave outputs at each photocell so that the accuracy of the code will not be impaired.

Accordingly, from rectangle II of Figure 1, it is possible to initiate a five digit system in which thirty-two quanta will be derived from each sine wave. The output of rectangle I is utilized to provide the first sixteen digits of a code. The sixteenth digit obtained from the cyclic to straight converter will be utilized in determining which sine wave of the reference circle output derived from rectangle II will be employed. Thus, the sixteenth digit output from rectangle I serves to perform a transition which subsequently will be described. It will be noted that four outputs from photocells A, B, C, and D are fed to rectangle III, which is a five digit cyclic code generator. The outputs from photocells A′, B′, C′, and D′ are fed to rectangle IV, which is another five digit cyclic code generator similar to the code generator in rectangle III.

The sixteen digit output obtained from rectangle I is supplied to rectangle V, which is a cyclic to straight code converter. Fifteen digits from the output of rectangle V are supplied to an adder in rectangle X. The sixteenth output digit of rectangle V is supplied to an "and" circuit illustrated as rectangle VI. The five digit cyclic code generator supplies five output voltages which are supplied to rectangle VII, which will be denoted as a Y cyclic to straight converter. One of the outputs from rectangle III is supplied to the "and" circuit of rectangle VI. The rectangle VI produces an output upon the occurrence of certain conditions. The output will be known as a quantity M, which is either thirty-two or zero depending upon the precedent conditions. Thus, under certain circumstances, the adder X will receive a voltage M which is then integrated into the final output of this device.

The adder X also receives the five outputs from the Y cyclic to straight converter of rectangle VII. The outputs of this latter rectangle are also supplied to a comparator IX, which also receives five output voltages from rectangle VIII, which is the Z cyclic to straight converter energized in accordance with voltages obtained from the second five digit cyclic code generator in rectangle IV. The comparator of rectangle IX produces an output voltage N, which corresponds to either zero or sixteen depending upon certain conditions. The quantity N is added into the final output by the adder rectangle X. The adder X also receives voltages from the Z cyclic to straight converter of rectangle VIII. The final output of rectangle X is equivalent to the increments represented by a twenty "straight" binary digit disc. In other words, the output indicates an incremental measurement of angular displacement of 360° divided by $2^{20}$ or 1¼ second increments.

Figure 7:
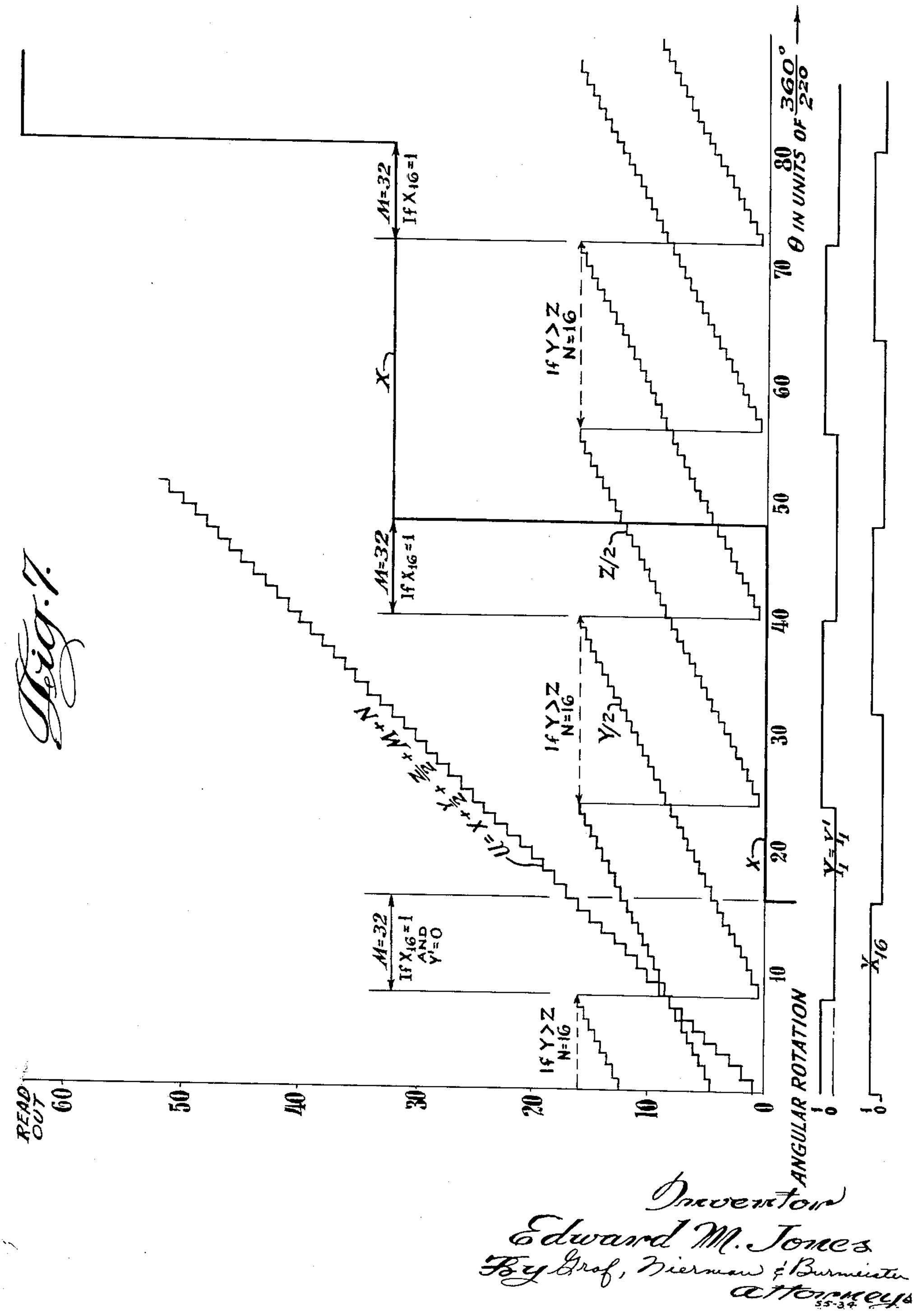
Figure 7 illustrates the addition of processed information to yield a straight line graph of electrical output versus mechanical input.

Because of the accuracy required in measuring angles to 10 seconds of arc, as in the example here disclosed, it is necessary to eliminate errors due to turntable wobble as stated above. Were this not necessary, it would only be necessary to combine the less significant digits derived from the reference track with the more significant digits directly encoded by the code member in the adder X, and the second code generator IV, photocells A′, B′, C′, and D′, "and" circuit VI, converter VIII, and comparator IX could be omitted. However, since the turntable introduced errors are omitted by generating two five digit codes phase related by 180 degrees and adding these two codes, it is necessary to provide some means to utilize the sum of these codes in obtaining the ultimate output. In the particular example here disclosed, this is accomplished by shifting the decimal point in each of the generated codes one place to the left, thus dividing the codes by two, and then adding the quotient of the two generated codes together. However, since the two generated codes are 180 degrees different in phase, as indicated in Figure 7, it is necessary to add one half the total value of total quanta value of each of the codes when the first code exceeds the second code in order to permit the sum of the quotients to proceed linearly to its maximum value, which is the total value of either one of the generated codes. This is the purpose of the comparator IX which generates the signal N so that $$Y/2+Z/2+N$$

has an average value proceeding linearly from 0 to 32 with rotation of the code disc.

As stated in Figure 1 and shown in Figure 7, the portion of the code directly encoded has an average value which is below the value of the true angle being encoded by an amount equal to the total value of the code generated from the reference track on the code disc. This is necessary since $Y/2+Z/2$ can never be zero, due to the difference in phase relation, and hence values below 8 can only be obtained by adding this sum to a negative code value, as is clear from Figure 7. However, during the periods when $Y/2+Z/2$ gives the proper value when added to the value of the code obtained directly from the code disc, the "and" circuit VI must add the total value of the code generated from the reference track to give the proper value for the entire code.

Figure 2:
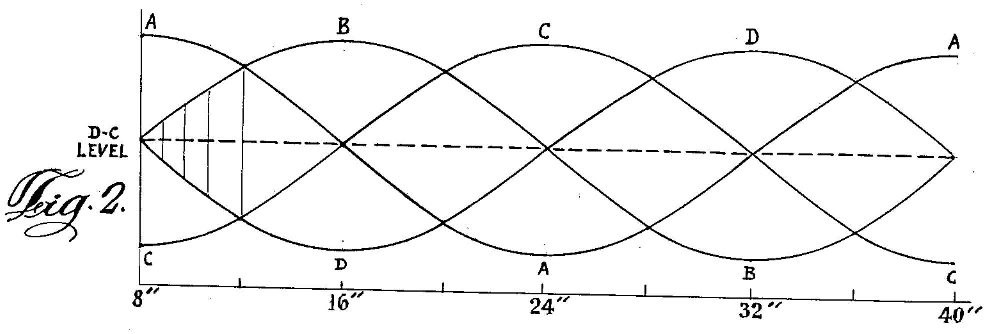
Figure 2 is a representation of certain wave forms utilized to derive extra digits or quanta.

It was stated that the output voltages of the four photocells A, B, C, and D varied sinusoidally, and these voltages have been illustrated by the representation in Figure 2. In order to convert the five digits in proper relationship, voltages A, B, C, and D are supplied directly to rectangle III and compared with each other so as to produce the outputs 1, 2, 3, 4, and 5 in proper sequence. It will be noted that the output 1 is determined by the relationship between D and B and is arranged so that if D—B is positive, a standard pulse representing a "1" is produced. Output 2 depends in a similar manner on C—A. Output 3 of rectangle III is determined by a comparison of the relative magnitudes of the differences between several different voltages obtained from the photocell outputs. Hence, output 3 is determined by $|B-D|-|A-C|$. Output 4 is determined by $$|A-C|-.414|B-D|$$

and also by $|B-D|-.414|A-C|$, both of which must be positive to give an output 4 out of the "and" circuit. Output 5 is determined by three different comparisons set forth in detail within the rectangle III.

Figure 3:
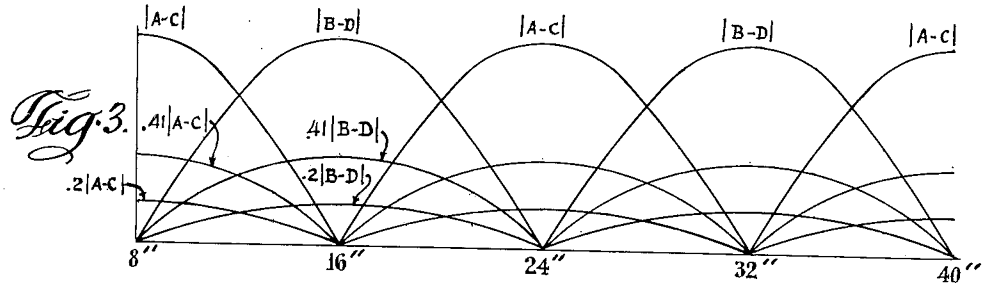
Figures 3, 4, 5 and 6 are graphical representations illustrating the mode of operation of the five digit cyclic code generators employed in Figure 1.
Figure 4:
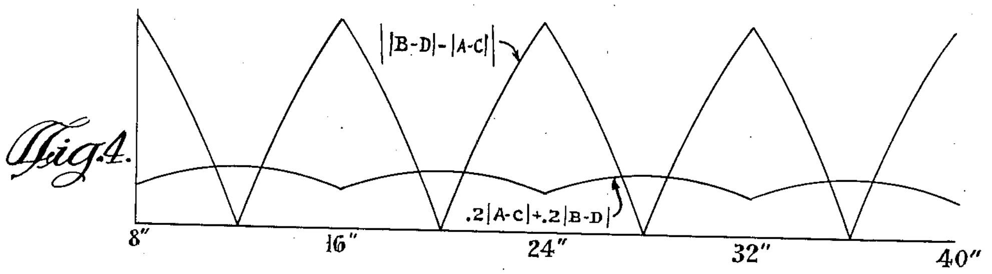
Figure 5:
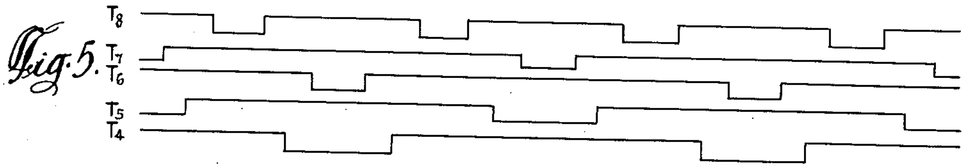
Figure 6:
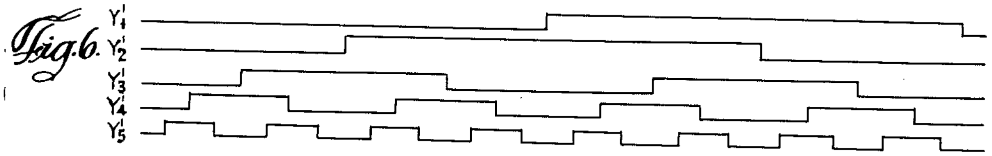

A comparison of these magnitudes which are employed in determining the outputs 1, 2, 3, 4 and 5 of rectangle III, is graphically illustrated by the curves in Figure 3. Certain of the comparisons made are further illustrated by the graphical representation in Figure 4. It will be noted that in rectangle III smaller rectangles $T_1$ to $T_8$ have been shown as serving to make certain comparisons and to produce certain outputs. The outputs of rectangles $T_4$ to $T_8$ are illustrated in Figure 5. These outputs of the rectangles $T_1$ to $T_8$ in turn determine the output voltages 1, 2, 3, 4 and 5, which in Figure 6 have been denoted $Y_1'$ through $Y_5'$. It will be appreciated that the other five digit cyclic code generator in rectangle IV and the cyclic to straight converter in rectangle VIII operate to produce five similar voltages $Z_1$ to $Z_5$.

The small rectangles $T_1$ to $T_8$ may be flip flop circuits functioning to provide an output of zero or an output of 1. An output of 1 occurs when the following conditions exist:

$T_8=1$ when $|/B-D/-/A-C/|>.2/A-C/+.2/B-D/$
$T_7=1$ when $/B-D/>.2/A-C/$
$T_6=1$ when $/A-C/>.2/B-D/$
$T_5=1$ when $/B-D/>.41/A-C/$
$T_4=1$ when $/A-C/>.41/B-D/$ From this it will be seen that the following relations obtain:

$Y_1'=T_1=1$ when $D>B$
$Y_2'=T_2=1$ when $C>A$
$Y_3'=T_3=1$
$Y_4'=1$ when $T_4$ and $T_5=1$
$Y_5'=1$ when $T_6$, $T_7$ and $T_8=1$ The "and" and "comparator" rectangles VI and IX comprise transition coincidizer circuits functioning to progress the output code in the correct order. From reference to Figure 7, it will be noted that if $Y_1'=0$ and $X_{16}$ is equal to 1, then M is equal to 32 is added. This illustrates the function of the control voltage $X_{16}$ since the sixteenth digit is thus effective at that time when $Y_1'$ becomes 0. It is to be noted that the X voltages and the Y voltages are supplied to the adder of rectangle X in parallel form. The voltages Z and M are fed to the adder in serial form. The necessary sequencing is accomplished with shift registers coupled to a multivibrator which initiates the shift pulses. The multivibrator is initially triggered from the programer, which also furnishes trigger information to the flash lamps that are used to illuminate the code patterns and the reference circle.

It will be noted that rectangle X, which is composed of adder type circuits which may comprise flip flop stages, adds $$\frac{Y}{2}+\frac{Z}{2}$$

thereby to effectively cancel out any errors arising from bearing run out and eccentricities. This will be appreciated from the representation of these quantities shown in Figure 7. This cancellation or error is so effective as to eliminate an error up to ten seconds of arc. This is due to the fact that this error would show in the quantity Y, but a similar and opposite error would appear in quantity Z.

In Figure 8 there is represented a code disc 30 having a plurality of alternate dark and light code markings 31 which comprise the digits of the disc. Near the outer periphery is a reference circle 32 which heretofore has been referred to. Along a slit are located a group of photocells 34, which in the example assumed would be sixteen in number to provide the sixteen outputs from rectangle I of Figure 1. Two groups of four photocells 35 and 36 at zero degrees and 180° correspond to the groups of photocells associated with rectangle II of Figure 1.

The representation shown in Figure 9 further illustrates the arrangement of Figure 8. Beneath the disc 30 is located a pulsed light source 37, which preferably is of gaseous discharge type delivering a light pulse of about ten microseconds per time. Light from the source 37 is focused through a lens 38 to pass through the reference circle 32, whereupon it passes through another lens 39. The light from lens 39 then passes through the auxiliary pattern elements 41 each associated with an individual lens 42, which in turn projects the light upon the group of photocells A, B, C and D. An alternative way of arranging this is shown in Figure 10 where the light from the lens 39 passes through three partially reflecting mirrors 43, 44 and 45, and then is received by suitable lens associated with the photocells A, B, C and D. The auxiliary grating or auxiliary pattern 41 for the various photocells previously has been described as integrating nearly one hundred divisions of the reference pattern for each photocell. The alternate dark and light image obtained from the reference pattern is shown in Figure 12 as 32 and being intercepted by the auxiliary pattern 41. The auxiliary pattern may be of the variable area illustrated in Figure 12 or may be of the variable density type so as to produce pulses in the output of each photocell having an envelope which is sinusoidal. These sinusoidal pulses 50 are shown having a sinusoidal envelope 51 in Figure 13. Any errors due to the bearing are eliminated by the use of the two sets of photocells 35 and 36 of Figure 8 controlling the production of codes Y and Z which are averaged together in the adder.

As further explanation of the arrangement of the circuits shown in rectangle X, reference may be had to Figure 11 which shows rectangles X, Y and Z supplying certain voltages to a plurality of frequency dividers. There are twenty-one frequency dividers or flip-flops, the latter ten being illustrated and designated F12 through F21, and the input of each of these dividers is connected to the output of the preceding divider, so that each divider will trigger once for each two triggers of the preceding divider. Each of the dividers has an input for a reset pulse generated from a programmer approximately simultaneously with the flashing of the light source. The fifteen outputs of the cyclic to straight converter V representing the most significant digits are also connected to the inputs of the first fifteen dividers, this connection for dividers F11 through F15 being illustrated in Figure 11. Hence, each of these dividers will trigger responsive to a pulse from the converter V representing the particular digit of that divider.

The output of the converter VII representing the most significant digit of the code generated by the generator III, designated $Y_1$ in Figure 11, is connected to the input of the divider F17 in parallel with the output of the converter VIII representing the most significant digit of the code generated by the generator IV. In like manner, corresponding outputs of the converters VII and VIII representing less significant digits are connected to the input of the dividers F18 through F21, respectively.

As stated above, outputs of the converters V and VII are impressed upon the dividers in parallel form, hence triggering only those dividers receiving a pulse derived from a transparent sector of the code disc or a pulse from the converter VII. Since the Z voltages from the converter VIII are impressed upon the dividers F17 through F21 in serial form, the least significant digit being first, some of the dividers can be expected to trigger a second time, thus triggering the following divider. In this manner, addition of the outputs of the converters VII and VIII is accomplished. Further, since the twentieth digit is obtained from the divider F20, rather than F21, the generated codes from the converters VII and VIII have been divided by two, for the purpose described above.

The output of the comparators VI and IX are connected to the inputs of dividers F14 and F15, respectively. During the periods when each of these comparators produces an output pulse, the respective divider is triggered. Thus, the N signal adds 16 to the output and the M signal adds 32 to the output. From this it will be seen that the output of the adder of rectangle X of Figure 1 is a series of voltages $U_1$ through $U_{20}$.

The purpose of a cyclic to straight converter is to obtain the outputs $X_1 \ldots X_{16}$ and $Y_1 \ldots Y_5$ according to the following relationships:

$X_1 = X_1'$
$X_2 = 1$ if $X_1' + X_2' = \text{odd}$
$X_3 = 1$ if $X_1' + X_2' + X_3' = \text{odd}$
* * * * * * * * * * * * * *
$X_{16} = 1$ if $X_1' + X_2' + X_3' + \ldots X_{16}' = \text{odd}$
($X_{16}$ $X_{17}$ $X_{18}$ $X_{19}$ $X_{20}$ considered 0 in adder)
$Y_1 = Y_1'$
$Y_2 = 1$ if $Y_1' + Y_2' = \text{odd}$
$Y_3 = 1$ if $Y_1' + Y_2' + Y_3' = \text{odd}$
$Y_4 = 1$ if $Y_1' + Y_2' + Y_3' + Y_4' = \text{odd}$
$Y_5 = 1$ if $Y_1' + Y_2' + Y_3' + Y_4' + Y_5' = \text{odd}$ NOTE.—Y is divided by 2 in the adder by shifting the decimal point one place.

By reference to Figure 7 it will be seen that the sixteenth digit $X_{16}$ obtained from the sixteen digit cyclic binary code disc, and fed through the converter V, is used to determine a number of things. This sixteenth digit determines which sine wave of the reference circle in the block II will be used. Coming from block V it controls certain transitions in the adder X at 16, 48, 80, etc. quanta. In Figure 7 it will be noted that $\theta$ has been indicated at $$\frac{360°}{2^{20}}$$

which is about 1.285 seconds of arc. Thus for each rotation of 1.285 seconds of arc, a quanta will be obtained. The quanta Y and Z are obtained from the reference circle division through the various means illustrated in the rectangular representations in Figure 1. In order to average out certain errors, quanta $$\frac{Y}{2} \text{ and } \frac{Z}{2}$$

are used by the adder X, and hence they have been illustrated in Figure 7. At certain times the adder is to receive additional information in addition to $$X + \frac{Y}{2} + \frac{Z}{2}$$

in order that the adder may provide the ultimate output quantity U. Thus, if $Y > Z$, then $N = 16$ is added. This occurs in the angular rotation of quanta zero to 8, 24 to 40, 56 to 72, etc. Upon other conditions prevailing, the quanta $M = 32$ is added, provided that $Y_1' = 0$ at a time when $X_{16} = 1$. This occurs during the quanta periods 8 to 16, 40 to 48, and 72 to 80, etc.

The graphical representation in Figure 7 further illustrates the incremental values obtained from $$\frac{Y}{2} \text{ and } \frac{Z}{2}$$

If the reference slit is at zero degree, then the outputs derived from the Y cyclic code converter VII may be taken as a reference. It then may be shown that an error up to ±8 quanta (or approximately ±10 seconds) in the Z output, which is a group of outputs derived from the information supplied from the 180° slit, can be eliminated by the addition of $$\frac{Y}{2} + \frac{Z}{2}$$

It can be shown that, if there is an error in Y up to 10 seconds of arc, there will be a similar but opposite error in Z. Figure 7 also shows the relationship between $X_{16}$ and $Y_1 = Y_1'$.

A typical cyclic to straight converter represented by the rectangles VII and VIII of Figure 1 is shown in Figure 14. Such converter could have a sequential pulse generator 52 which has an initiating input 53 responsive to the pulse which controls the light source 37 of Figure 9. The sequential pulse generator 52 upon receiving the initiating signal or pulse from input 53, thereafter at regularly timed intervals supplies successive pulses to output conductors 54 through 58. These pulses might occur at 10, 20, 30, 40 and 50 microseconds after the lamp flash.

When the lamp is flashed, the various trigger circuits $T_1$ through $T_8$ of rectangle III of Figure 1 are triggered to give an output of "1" or "0" according to whether positive or negative pulses are received by them. The trigger circuits are arranged to retain their respective outputs as D.-C. voltage levels until the next lamp flash occurs. These voltages are designated $Y_1'$ through $Y_5'$.

The voltages $Y_1'$ through $Y_5'$ are supplied to a plurality of "and" circuits 61 to 65 which are also connected to conductors 54 and 58 respectively. The outputs of the "and" circuits are supplied to an "or" circuit 66 having an output connected to a flip flop 67. The flip flop 67 has another input circuit 68 provided with a reset pulse coincident with the lamp flash pulse thereby periodically resetting the flip flop 67 to a "0" condition.

The output of the flip flop 67 is supplied to a plurality of "and" circuits 71 to 75 which are connected to the conductors 54 to 58 respectively. Upon being reset to the "0" condition, the flip flop 67 successively goes into conditions representing a five digit straight binary code. By combining the output of the flip flop 67 with the "and" circuits 71 to 75, the digits $Y_1$ through $Y_5$ of the straight binary code are obtained as pulses on the outputs of the "and" circuits 71 to 75.

This sequential presentation of the five digit code is particularly suited for the comparator of rectangle IX as represented in Figure 15. The comparator of Figure 15 utilizes two "or" circuits 77 and 78. The pulses $Y_1$ through $Y_5$ are supplied to the "or" circuit 77. Similarly generated pulses $Z_1$ through $Z_5$ obtained from rectangle IV of Figure 1 are supplied to the other "or" circuit 78.

The function of the comparator is to generate a pulse N whenever the five digit number represented by the Y pulses is greater than the five digit number represented by the Z pulses. A simple method of comparison is to compare successively similar or corresponding digits of the two five digit numbers, starting with the most significant ones ($Y_1$ and $Z_1$), and proceeding until two digits are found to be different.

This comparison is obtained by supplying the signals from the "or" circuit 77 directly to an "and" circuit 81, and through an inverter 82 to an "and" circuit 83. Similarly the output of the other "or" circuit 78 is supplied directly to the "and" circuit 83 and through an inverter 84 to the "and" circuit 81. If both digits are the same, i.e., either both are 1 or both are 0, then neither "and" circuit will produce an output.

If the Z pulse is 1 and the Y pulse is 0, the "and" circuit 83 will produce a 1 output which will pass through an "or" circuit 85 to a flip flop 86. The flip flop 86 was originally set to a "0" condition by a reset pulse on input conductor 87. The flip flop 86 in going from "0" condition to "1" triggers a pulse generator 88 connected to an "and" circuit 89. In this instance the "and" circuit 89 produces no output since the Y input on conductor 90 is "0." There is no possibility of producing an output from the "and" circuit 89 until the flip flop 86 is reset by the next lamp flash pulse.

If the Z pulse is 0 and the Y pulse is 1, the "and" circuit 81 will produce a "1" output which will trigger the flip flop 86 thereby actuating the pulse generator 88. Since the Y pulse on conductor 90 is "1," the "and" circuit 89 will produce an output N.

In the foregoing comparisons it will be noted that upon a difference between the Y and Z digits, the output N is dependent upon whether Y is "1" or "0" at the instants that the digits are being compared. An output from the "and" circuit 89 occurs only when the five digit number represented by the Y pulses is actually greater than the number represented by the Z pulses.

While for purposes of a simplified explanation certain circuits have been designated for the diagrammatic embodiments shown in Figures 14 and 15, the invention is not to be limited thereto. Having had the benefit of the disclosures and explanations of Figures 14 and 15, those skilled in the art will readily envision other arrangements. Since the Y pulses and the Z pulses occur simultaneously, the "or" circuits 77 and 78 could be eliminated by connecting the conductor 70 directly to the output of the flip flop 67 of Figure 14 and the conductor 80 to the output of the flip flop corresponding to flip flop 67 which is provided for the Z pulses in rectangle VIII. From this it will be furthermore apparent to those skilled in the art that the functions of the circuits in rectangles VI and IX of Figure 1 serve as transition coincidizers to progress the output code in the correct order and to provide at the proper times the effective quantities M and N for the adder X.

While for the purpose of illustrating and describing the present invention certain embodiments have been shown in the drawings, it is to be understood that such modifications and variations may be made as may be commensurate with the spirit and scope of the invention set forth in the accompanying claims.

I claim as my invention:

1. In an analog to digital encoder system, a digital code member having a plurality of tracks and a reference track divided into equal segments at least as fine as the smallest segment of the other tracks, means for deriving multidigit code signals from said reference track including a plurality of electrical pickup means confronting said track for generating electrical waves differing in phase by equal increments of 360°, means for algebraically combining the generated electrical waves into at least as many combinations as generated waves, and means for producing a digital output from each combination of said generated waves responsive to a threshold potential of the combined waves, means for generating multidigit code signals from the other tracks of the code members, and means for combining said reference track digital signals with the digital signals obtained from said code member.

2. In an analog to digital encoder system, a digital code member having a group of tracks and a reference track divided into equal segments at least as fine as the smallest segment of the group of tracks, means for deriving digital signals from the group of tracks of said code member, means for deriving from said reference track a plurality of additional digital signals beyond those available from the group of tracks of said code member including a plurality of electrical pickup means confronting said track for generating electrical waves differing in phase by equal increments of 360°, means for algebraically combining the generated electrical waves into at least as many combinations as generated waves, and means for producing a digital output from each combination of said generated waves responsive to a threshold potential of the combined waves, and means for combining said additional digital signals with the digital signals obtained from said first means to produce an output corresponding to a code member having a total number of digits approaching the sum of those of said first member together with said additional digits.

3. In an analog to digital encoder system, a digital code disc having a peripheral reference circle divided into a large number of alternate opaque and transparent areas, two groups of photoelectric responsive units located at opposite sides of the diameter of said disc, a light source for each group of photoelectric responsive units, means for causing said units each to generate a sinusoidally varying wave in accordance with said reference circle, the outputs of said units differing in phase by equal increments of 360°, means for deriving a digital code output in accordance with the outputs of each group of units including means for algebraically combining the generated electrical waves into at least as many combinations as generated waves, and means for producing a digital output from each combination of said generated waves responsive to a threshold potential of the combined waves, means for obtaining a digital output from said code disc, and means for coordinating and combining all said digital outputs to provide a higher order digital code output.

4. In an analog to digital encoder, a code member having an evenly divided reference track, means for deriving a plurality of sinusoidally varying waves in accordance with said reference track, said sinusoidally varying waves being phase displaced by equal increments, including means for algebraically combining the generated electrical waves into at least as many combinations as generated waves, and means for producing a digital output from each combination of said generated waves responsive to a threshold potential of the combined waves.

5. In an analog to digital encoder, a code member having an evenly divided reference track, photoelectric means for deriving at least three sinusoidally varying waves in accordance with said reference track, said sinusoidally varying waves being phase displaced by equal increments, including means for algebraically combining the generated electrical waves into at least as many combinations as generated waves, and means for producing a digital output from each combination of said generated waves responsive to a threshold potential of the combined waves.

6. The combination comprising a five digit code generator, a code member having an evenly divided reference track, means for projecting light through said reference track, a plurality of photoelectric devices arranged to be energized by said light, means for integrating the light passing through a number of divisions of said reference track and for distributing said light among said photoelectric devices, means for causing said photoelectric devices to produce sinusoidally varying signals, and means for controlling said five digit code generator with said sinusoidally varying signals.

7. The combination according to claim 3 wherein the digital code outputs derived in accordance with said photoelectric units are supplied to an adder together with the digital output from the code disc.

8. The combination according to claim 3 wherein the means for coordinating and combining all digital outputs comprises an adder combining one half of each of the outputs derived from said photoelectric units with the digital output from the code disc.

9. An encoder according to claim 2 wherein each track of the group of tracks of the code member define opaque and transparent sectors equal in number to a power of two, and the group of tracks have sectors equal in number to successive powers of two, the reference track having transparent and opaque sectors equal in number to the next higher power of two from the finest divided track of the group, the means for combining the additional digital signals with the digital signals from the first group of tracks including means to add a correction quantity to the digital output when the least significant digit of the binary number produced by the first group of tracks has an output.

10. The encoder according to claim 2 wherein the means for combining said reference track digital signals with the digital signals of the code member includes means for correlating the output of the second mentioned digital signal deriving means with the digital signals from the code member.

11. In an analog to digital encoder system, a digital code disc having a peripheral reference circle divided into a large number of equal areas of opposite significance, electrically responsive means located adjacent said reference circle and diametrically opposite each other, means actuated by said electrically responsive means for generating sinusoidally varying outputs, means for deriving a digital code output having a plurality of quanta from said sinusoidally varying outputs, means for deriving from said code disc a plurality of digital quanta, and electronic adder means for combining said two sets of digital quanta to provide a higher order digital code output.

12. An analog-to-digital encoder comprising a code disc having a first group of tracks and a reference track having a number of equal divisions of an order higher than the number of divisions in any track of the first group of the code member, a plural digit code generator controlled by said reference track, means for deriving a code output from the first group of tracks of said member, and an adder for receiving the quanta outputs of said code member means and said code generator.

13. An analog-to-digital encoder comprising a code member having a first group of tracks and a reference track having a number of equal divisions of the next higher order than the number of divisions in any track of the first group of the code member, a five digit code generator controlled by said reference track including a plurality of electrical pickup means confronting said track for generating electrical waves differing in phase by equal increments of 360°, means for algebraically combining the generated electrical waves into at least as many combinations as generated waves, and means for producing a digital output from each combination of said generated waves responsive to a threshold potential of the combined waves, means for deriving a code output from the first group of tracks of said member, an adder for receiving the quanta outputs of said code member means and said code generator, and a plurality of transition coincidizer circuits for supplying additional quanta to said adder, to provide an output having four more digits than that obtainable directly from said code member.

14. An analog-to-digital encoder comprising a cyclic code disc having a plurality of code circles and a peripheral reference circle having a number of equal divisions of an order higher than the number of cycles obtainable from the code circles of said disc, a plurality of five digit cycle code generators controlled by said reference circle at diametrically opposite points thereon, means for deriving a cyclic digital output from said code disc, means for converting to straight digital codes the cyclic outputs from said code disc and from said code generators, an adder for receiving said converted code disc output and the average of the converted outputs of said code generators, and a plurality of transition coincidizer circuits for supplying additional outputs to said adder to produce a straight digital code output of a much higher order than the digital code output obtained from said code disc.

15. An analog-to-digital encoder comprising a cyclic code disc having a plurality of code circles and a peripheral reference circle having a number of equal divisions of the next higher order than the number of cycles obtainable from the code circles of said disc, a plurality of five digit cyclic code generators controlled by said reference circle at diametrically opposite points thereon, each of said generators including a plurality of electrical pickup means confronting said reference circle for generating electrical waves differing in phase by equal increments of 360°, means for algebraically combining the generated electrical waves into at least as many combinations as generated waves, and means for producing a digital output from each combination of said generated waves responsive to a threshold potential of the combined waves, means for deriving a cyclic digital output from said code disc, means for converting to straight digital codes the cyclic outputs from said code disc and from said code generators, an adder for receiving said converted code disc output and the average of the converted outputs of said code generators, and a plurality of transition coincidizer circuits for supplying additional outputs to said adder to produce a straight digital code output of an order four digits higher than the digital code output obtained from said code disc.

16. The system according to claim 15 wherein the highest order digital output of the converting means derived from said code disc and the lowest order digital output of the converting means derived from one of said five digit cyclic code generators control one of the transition coincidizer circuits.

17. The system according to claim 15 wherein the highest order digital output derived in accordance with said code disc controls one of said transition coincidizers.

18. In an analog-to-digital encoder system, a digital code disc having a circle provided with a number of equal divisions of an order higher than the number of cycles obtainable from the remainder of the code disc, means for projecting light through said circle, a plurality of photoelectric devices responsive to said projected light, means for causing said devices to produce a plurality of sinusoidally varying signals displaced from each other by 90°, and including means for algebraically combining the generated electrical waves into at least as many combinations as generated waves, and means for producing a digital output from each combination of said generated waves responsive to a threshold potential of the combined waves.

19. The combination of claim 18 with means for obtaining an output from said disc, means associated with the means for obtaining an output from the disc for generating a multidigit code, and means for combining the multidigit code generated by said last means with the code generated from the sinusoidally varying signals.

20. In an analog-to-digital encoder system, a digital code disc having a circle provided with divisions of an order higher than the number of cycles obtainable from the remainder of the code disc, a plurality of groups of photoelectric devices located at diametrically opposite places on said circle, means for projecting light through said circle to cause each group of photoelectric devices to produce a plurality of sinusoidally varying signals displaced in phase by 90°, and circuit means for comparing the magnitudes of said signals with each other to generate a five digit code output.

21. A digital code generator comprising a rotatable disc having a track of alternate transparent and opaque sectors, a plurality of photoelectric pickup means confronting said track and spaced from each other for generating electrical waves differing in phase by equal increments of 360°, means for algebraically combining the generated electrical waves into at least as many combinations as generated waves, and means for producing a digital output from each combination of said generated waves responsive to a threshold potential of the combined waves.

References Cited in the file of this patent

UNITED STATES PATENTS

| | | |
|---|---|---|
| 2,715,678 | Barney | Aug. 16, 1955 |
| 2,747,797 | Beaumont | May 29, 1956 |
| 2,755,020 | Belcher | July 17, 1956 |
| 2,758,788 | Yaeger | Aug. 14, 1956 |
| 2,765,459 | Winter | Oct. 2, 1956 |
| 2,779,539 | Darlington | Jan. 29, 1957 |
| 2,792,545 | Kamm | May 14, 1957 |
| 2,866,184 | Gray | Dec. 23, 1958 |

UNITED STATES PATENT OFFICE

CERTIFICATE OF CORRECTION

Patent No. 2,986,726 May 30, 1961

Edward M. Jones

It is hereby certified that error appears in the above numbered patent requiring correction and that the said Letters Patent should read as corrected below.

Column 3, line 8, after "time" insert a comma; column 5, line 35, after "$Y_3'=T_3=1$" insert -- when $/B-D/ \gg /A-C/$ --; column 11, line 52, for "cycle" read -- cyclic --.

Signed and sealed this 19th day of December 1961.

(SEAL)
Attest:

ERNEST W. SWIDER
Attesting Officer

DAVID L. LADD
Commissioner of Patents

USCOMM-DC